Figure 1:
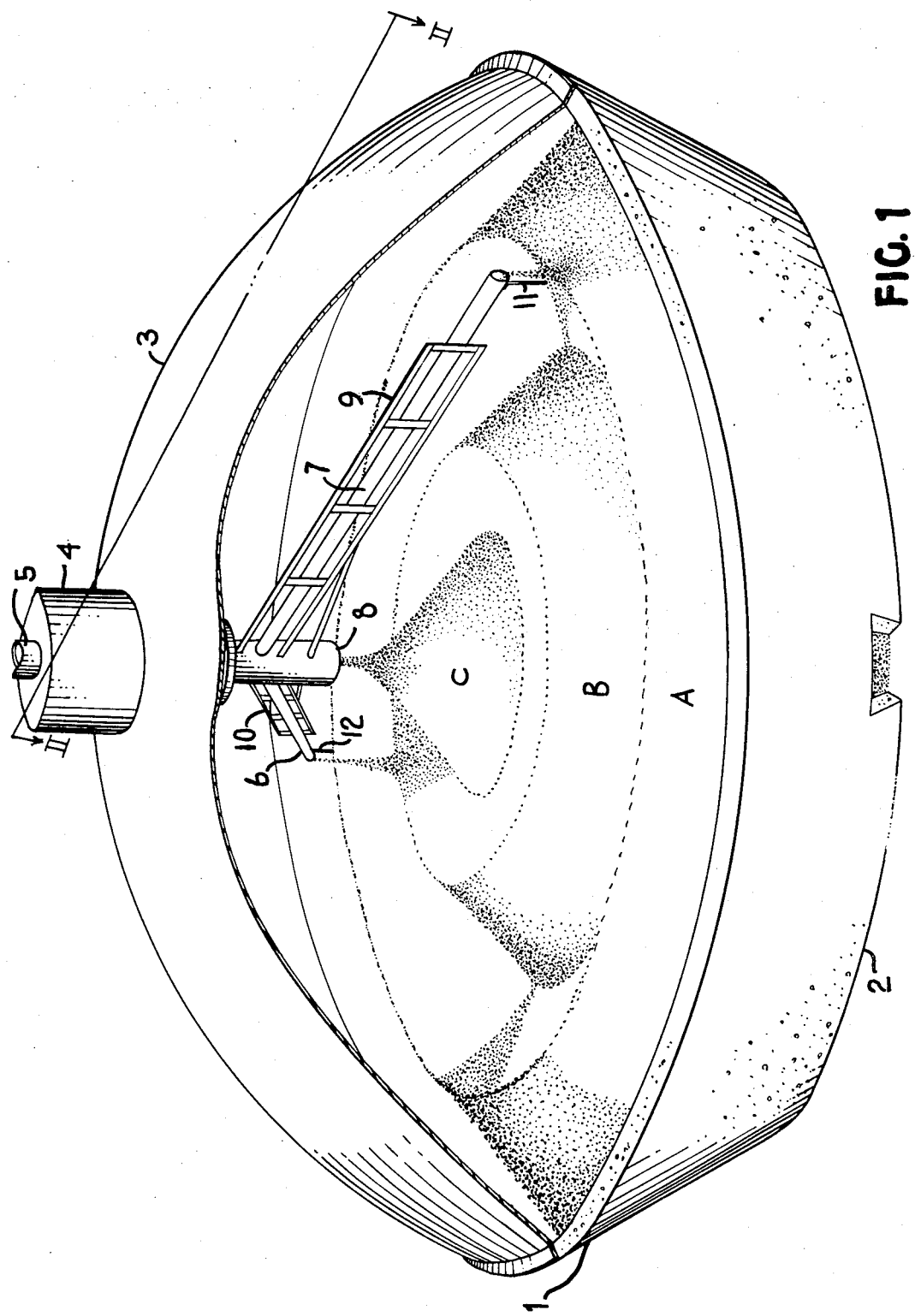

United States Patent
Kelly et al.

[15] 3,703,241
[45] Nov. 21, 1972

[54] METHOD OF STORING PARTICULATE MATTER

[72] Inventors: Clifford J. Kelly; Regina Kelly, both of Saskatchewan, Canada; Bernard J. Hukee, Jr., Muscatine, Iowa

[73] Assignee: Kalium Chemicals Limited, Saskatchewan, Canada

[22] Filed: Nov. 18, 1971

[21] Appl. No.: 200,038

Related U.S. Application Data

[63] Continuation of Ser. No. 28,337, April 14, 1970, abandoned.

[52] U.S. Cl. ............... 214/152, 214/10, 214/10.5, 214/17 CB
[51] Int. Cl. ............................................. B65g 65/32
[58] Field of Search ......... 214/10, 16 R, 17 CB, 10.5, 214/152; 198/65, 66, 68, 74, 36

[56] References Cited

UNITED STATES PATENTS 3,339,760   9/1967   Louks ............... 214/17 CB
860,365   7/1907   Fry ............... 214/10

FOREIGN PATENTS OR APPLICATIONS 504,210   7/1951   Belgium ............... 198/74

*Primary Examiner*—Robert G. Sheridan
*Attorney*—Russell A. Eberly

[57] ABSTRACT

A method of storing particulate matter having a small particle size range, i.e. 2.5 to 325 mesh and which is susceptible to fracturing and breakage during handling is described. The material is stored in circular warehouses in a plurality of circumferential piles. Each circle of piled material has a different circumference and the vertical drop of the material from its entry into the warehouse to its resting place in the warehouse is minimized to avoid breakage. Uses of the method to store CK1, KaCl, $CaCl_2$ and mixed fertilizers are specifically disclosed.

12 Claims, 2 Drawing Figures

METHOD OF STORING PARTICULATE MATTER

This is a continuation of application Ser. No. 28,337, filed Apr. 14, 1970 now abandoned.

BACKGROUND OF THE INVENTION

Granular materials such as potash, soda ash, fertilizers, salt and the like have been stored in bulk in warehouses in the past. These warehouse structures are typically quite large, holding many tons of material. In the storage of potash, for example, quantities of material on the order of 100 tons and more is typical. In storing quantities of material of this magnitude, circular warehouses have been employed extensively. These warehouses have a dome-shaped roof structure and are, because of their shape, referred to as "bee hives." In a typical "bee hive" warehouse the material is loaded from the apex of the domed roof, falls to the floor of the warehouse and filling is continued until the warehouse is filled with a large conical pile of material approximating the shape of the warehouse.

Many difficulties are encountered with these prior methods of storage as applied to fine particulate matter, i.e., matter in a size range of 2.5 to 325 mesh or smaller. Thus, when storing fine particulate material in a single conical pile such as conventionally found in "bee hive" warehouses, it is found that considerable segregation of the particles occurs during storage and filling. Generally, the central area of the stored pile of particulate material will be found to contain the finer particles, while the larger particles will be found away from the center of the pile. When these stored piles of fine particulate material are taken out of a warehouse for shipment, the first product normally removed is the product on the outer surface of the pile. Since the coarse material tends to be concentrated in this area, a product of predominantly large particles is normally removed from this outer surface of the pile. As the unloading proceeds toward the center of the pile, the character of the particles changes so that small particles are removed predominantly as the center of the storage pile is reached. Thus, as will be readily appreciated when a range of sizes is stored, during removal the same range is not present and product will tend to be quite different as regards particle size distribution depending on the area of the stored pile from which the material is being removed. Since generally, customer specifications require a range of sizes for most materials such as potash, a predominance of either coarse or fine particles in any given shipment is an often undesirable condition.

THE INVENTION

In accordance with the teachings of the present invention, the disadvantages present in the prior art methods of storage heretofore enumerated are avoided by placing the material during storage in a circular warehouse in a particular and selected manner to thereby minimize segregation of the particles of the stored material and permit withdrawal of material from the warehouse in a size range similar to that present in the material as it was loaded into the warehouse.

Thus, in accordance with this invention, piles of the material to be stored in a "bee hive" or similar circular warehouse are placed therein in such a manner so as to minimize the establishment of any substantial concentration of fine or coarse particles in any localized area of the floor. This is accomplished by providing a series of concentric rings of particulates in the warehouse, each ring being a continuous pile of substantial height. A single continuous spiral of the material can also be employed in providing a pile of stored product that is not subject to substantial segregation in any large, localized floor area of the warehouse.

The preferred method of storing particulates in accordance with the instant invention involves placing the material to be stored in a "bee hive" or similar circular warehouse circumferentially in a continuous pile adjacent the inside wall of the warehouse by dropping the material from a feed point positioned a fixed distance above the floor of the warehouse. The feed of material is regulated so that when a cone of a specific height has been developed around the warehouse, the feed of material is terminated on that circumferential pile. A second feed point is then established at a point above the inner side of the first circumferential pile of material already formed in the warehouse and at a fixed distance above the side of that pile.

The second circumferential pile of material is placed in the warehouse inside of the first pile and using one side of the first pile as a part of the base for that second pile. Again, as with the first pile when the feed point is reached by the second pile of particulate material in vertical height all around the warehouse, the feed is shut off to that second pile. Another pile is then begun if a third pile is necessary to fill the warehouse by using the inside side of the second circumferential pile as a base for the third pile. In a typical operation the final pile of material is typically a cone of particulates located inside a circumferential pile and loaded on the inside side of that circumferential pile typically from the center of the roof or dome of the warehouse.

All of these piles of material have the particulates dropped a vertical distance which is fixed at a maximum drop for any particular material. The distance will vary depending on the material to be stored and is determined by the resistance of the material being stored to fracturing when striking the floor or other particulate in a free fall. Thus, the maximum distance from which the particulate matter fed to a warehouse may be dropped in accordance with this invention is that distance for the particulate matter fed which will cause less than 10 percent of the particles striking a concrete floor in a free fall to fracture or break.

Figure 2:
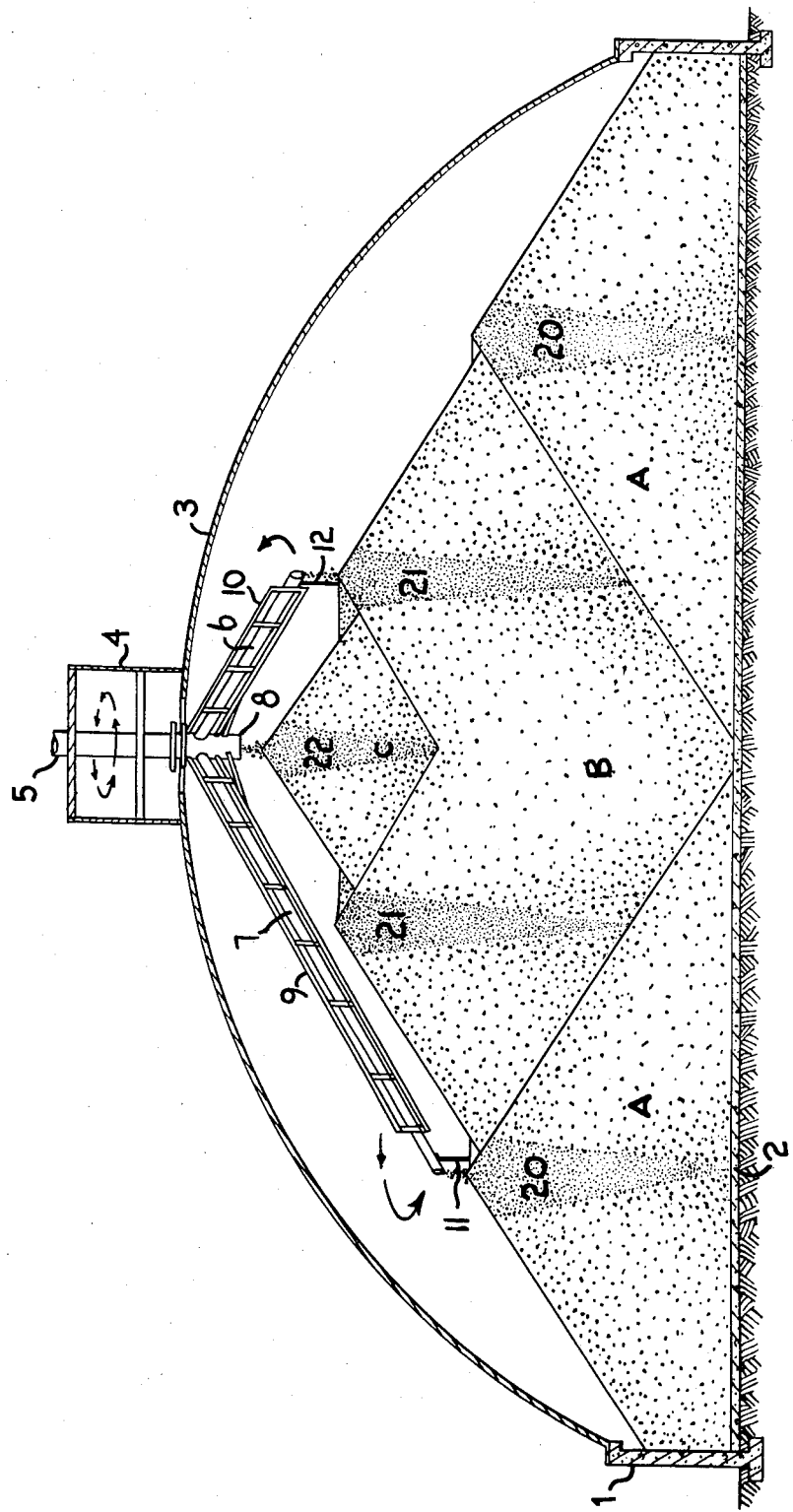

For a more complete understanding of the present invention reference is made to the accompanying drawings in which:

FIG. 1 is a side elevation of a "bee hive" warehouse with the roof broken away to show the interior disposition of the circumferential piles of material placed therein; and FIG. 2 is a cross section of the warehouse of FIG. 1 taken along the lines II—II of FIG. 1.

Turning to the drawing and FIG. 2 in particular, there is shown in section a "bee hive" warehouse having a wall 1, a floor 2 and a dome-shaped roof 3 mounted on the wall 1. At the apex of the roof 3 is a housing 4 for a feed chute 5. Chute 5 communicates with two smaller chutes 6 and 7 and has a discharge opening 8 at the end thereof positioned in the interior of the warehouse. Chute 5 and the chutes 6 and 7 attached thereto are rotatable inside the warehouse. This rotation of the chutes 6 and 7 is accomplished by suitable engagement of the chute 5 with a motor (not shown). Chutes 6 and 7 which hang from the chute 5 are supported by box-type truss members 10 and 9, respectively. A sensor 12 is provided on the end of chute 6 and a sensor 11 is provided on the end of chute 7. These sensors are associated with valves (not shown) to shut off flow of material in the chutes 6 and 7 under certain conditions as hereinafter discussed.

The wall 1 is provided with an entry 13 (FIG. 1) which provides access on the ground level to the interior of the warehouse. Material stored in the warehouse can be removed through entry 13 or may be unloaded by providing discharge ports in the floor 2 of the warehouse with suitable passages to the exterior of the warehouse for removing the material from the warehouse.

In FIG. 1 and FIG. 2, material is shown being discharged from chutes 5, 6 and 7 simultaneously. This is for illustrative purposes only. As practiced in its preferred embodiment, the material to be stored in accordance with this invention is fed to the warehouse through chute 5 to chute 7 first. Chute 7 is spaced from the floor 2 of the warehouse a fixed distance. In the case of the storage of KCl, for example, this distance is typically 35 feet. The material to be stored is fed from chute 7 into the warehouse and drops to floor 2. This feed through chute 7 is maintained continuously until a pile of particulates is formed which reaches the sensor 11. The chute 7 is then rotated slowly around the warehouse to extend the pile at that vertical height. This loading is continued until the pile ultimately extends around the inside wall of the warehouse at a vertical height equal to the height of the tip of the sensor 11. While it is preferred to load the first section of material stored as above described, the truss member 9 and associated chute 7 can be rotated more rapidly so that the first circumferential pile is built up gradually all around the warehouse until ultimately the sensor 11 is reached by the pile all around the warehouse. Feed through chute 7 is of course then shut off by closing the valve associated with or actuated by the sensor 11. The valve (not shown) associated with sensor 11 may take any convenient form, such as for example, a gate valve. Any conventional mechanical valve may be employed which can be adapted to be actuated by the sensor 11. While mechanical actuation is typical, recourse to electrical valve actuation can also be employed.

The particulate material to be stored is fed into the warehouse through chute 6 after the first circumferential pile of particulate matter is established. This feed through chute 6 is also preferably on a continuous basis. The material discharged from the end of chute 6 is directed against the inside surface of the first pile A at a fixed vertical distance from the end of chute 6 to provide minimum breakage of the material fed. The chute 6 is rotated slowly and material is fed therethrough continuously to form a pile B in the same manner as pile A was formed in the preferred embodiment described above. As the pile B reaches a vertical height sufficient to actuate the sensor 12, the arm 10 and chute 6 move in circular fashion to extend the pile B circumferentially at that vertical height. Ultimately when the pile B is completed, the sensor 12 actuates the valve associated therewith to close the chute 6 to the flow of material. Chute 5 is then employed as the feed chute to the warehouse and the particulate material drops from the end 8 of chute 5 onto the interior side of pile B. The addition of particulates to the warehouse is continued until a pile C has been established. Typically this pile is at a height sufficient to reach or nearly reach (within 5 to 10 feet thereof) the end 8 of the chute 5. Flow of material is then stopped and the warehouse is loaded.

As can be seen in FIG. 2, in particular, the material stored as described above tends to segregate in the piles formed so that a predominance of fine material is located in a central zone 20 of the pile A, in zone 21 of pile B and zone 22 of pile C. A predominance of coarser particles are shown to be located in the areas surrounding these zones. The result of providing such a plurality of circumferential piles of particulates is the avoidance of any large central zone of fines on any localized area of the warehouse floor as would be the case if a single large cone of particulate was used to fill the warehouse. The distribution of fines, by loading the warehouse as above described, is over a wide range of floor surface or area and all fines are surrounded by a large bulk of coarse material. Thus, when a shovel, scoop, high loader blade or other similar unloading device is introduced into the warehouse to remove material, it engages the exterior of the outer pile first and proceeds inwardly. In its path to the interior of the warehouse, it will be appreciated with material stored as shown in FIG. 2, only a small area of fines will be encountered during unloading so that product distribution will tend to include a representative particle size range of the range of particles initially stored in the warehouse.

The following example typifies the operation of the instant invention as applied to the storage of KCl in the particle size range of 6 to 28 mesh.

EXAMPLE

In a warehouse such as shown in FIGS. 1 and 2, KCl in the size range of 8 to 20 mesh was introduced through chute 7. The end of chute 7 was positioned 35 feet above the floor 2 of the warehouse. KCl was allowed to flow through chute 7 until a pile of material high enough to contact sensor 11 was formed. When this occurred, chute 7 was rotated counterclockwise to clear the sensor 11 and KCl was continued through chute 7 to extend the initial pile in a circumferential manner. This method of operation was continued until a pile A of substantially uniform height was provided around the interior of wall 1. The feed through chute 7 was stopped at this point and material was introduced through chute 6 and onto the inside of pile A. This feed was continued until the pile reached the sensor 12 at which point chute 6 was rotated counterclockwise to continue the pile in a circumferential manner and at a uniform height. When pile B has been completed the chute 6 closed and feed of KCl is continued through chute 5 and opening 8 therein to form a central pile C of KCl granules. As can be appreciated from an examination of the drawing, the KCl granules, though segregated by size in the piles are so positioned within the warehouse that removal therefrom will provide a variety of the segregated granules. It has been found using this method of storage that the incidence of offspecification material being found in batches of KCl unloaded has been substantially reduced.

As described in the above example, a series of concentric rings of material, placed in continuous piles of substantial vertical height are employed. If desired a spiral shaped continuous pile of material can be provided and a similar benefit achieved in that localized, heavy concentration of fines is avoided. Thus, if desired a telescopic type chute can be used in lieu of the chutes 6 and 7 and material can be fed to the warehouse in such a manner that a spiraling pile of material of substantial height is provided adjacent the sides and roof of the warehouse to substantially fill it.

While KCl has been described above in connection with the example and drawing, this has of course been only for illustrative purposes. Thus, NaCl, CaCl₂, fertilizers such as phosphates and nitrates, sodium carbonate, sand and other like materials generally found in the size range of 2.5 to 325 mesh may be stored in the same manner with like benefits occurring.

Thus, while the invention has been described with reference to certain specific embodiments and illustrations, it is not intended that it be so limited except insofar as appears in the accompanying claims.

We claim:

1. A method of storing KCl particles of a size range of 6 to 28 mesh in a warehouse, comprising establishing a first circular pile of KCl by introducing KCl into the warehouse from a feed point positioned a fixed distance above the warehouse floor and moving the feed point circumferentially around the warehouse until a first continuous pile of fixed vertical height is formed, establishing a second circular pile of KCl within said first pile by feeding KCl against the inside surface of said first ring from a feed point positioned a fixed distance above said inside surface and moving the feed point circumferentially around the warehouse until a second continuous pile of given vertical height is formed and establishing at least one further pile of KCl by feeding further quantities of KCl against the inside surface of said second pile and each of any succeeding piles from feed points positioned a fixed distance above the inside surface of said piles until a central conical pile of KCl is formed, said fixed distance being such that the KCl introduced from the feed point experiences a breakage of less than 10 percent.

2. The method of claim 1 wherein the first continuous pile of KCl is adjacent the inside wall of the warehouse.

3. The method of claim 1 wherein the feed point for the first continuous pile of KCl is not more than 40 feet above the floor of the warehouse.

4. A method according to claim 1 wherein the feed point for the second and succeeding piles of KCl is not more than 50 feet above the portion of the inside surface of the KCl pile onto which the KCl is fed.

5. A method according to claim 1 wherein the apex of the central conical pile of KCl is within 30 feet of the roof of the warehouse.

6. The method of claim 1 wherein there are three piles of KCl.

7. The method of claim 1 wherein the circular pile of KCl is established by forming a conical pile of KCl of fixed vertical height and extending the apex of the conical pile so formed by moving slowly the feed point circumferentially around the warehouse until the continuous circular pile of KCl at the fixed vertical height is formed.

8. The method of claim 1 wherein the circular pile of KCl is established by continuously moving the feed point circumferentially around the warehouse until the continuous circular pile of KCl at the fixed vertical height is formed.

9. A method of storing KCl particles of a size range of 6 to 28 mesh in a warehouse having a circular shaped floor, comprising introducing KCl into the warehouse from a feed point positioned a fixed distance above the warehouse floor until a conical pile of KCl of fixed vertical height is established, extending the apex of the conical pile so formed by moving the feed point circumferentially around the warehouse and thereby establishing a first continuous ring of KCl of said fixed vertical height around the warehouse, shutting off the feed of KCl to said first ring, feeding KCl against the inside surface of said first ring from a feed point positioned a fixed distance above said inside surface until a further conical pile of KCl of given height is established, extending the apex of the further conical pile so formed by moving the feed point circumferentially around the inside of said first ring and thereby establishing a second continuous ring of KCl of said given height inside said first ring, shutting off the feed of KCl to said second ring, and feeding further quantities of KCl against the inside surface of said second ring and each of any succeeding rings from feed points positioned a fixed distance above the inside surface of said rings until a central conical pile of KCl is formed, said fixed distance being such that the KCl introduced from the feed point experiences a breakage of less than 10 percent.

10. A method of storing particles of KCl of a size range of 6 to 28 mesh in a warehouse having a circular shaped floor comprising introducing said KCl through a chute positioned not more than 40 feet above the floor of the warehouse, establishing a conical pile of said KCl to a fixed vertical height, extending the apex of the conical pile so formed by moving the chute circumferentially around the warehouse to establish a continuous ring of KCl around the warehouse at that height, shutting off the feed to the pile when the said ring is completed, feeding KCl onto the inside surface of the ring so formed from a chute positioned a distance no greater than 50 feet above said surface to establish a conical pile of a given height, extending the apex of the pile so formed by moving the feed chute circumferentially around the inside of said first pile and establishing a second continuous ring inside the said first ring at a given height, shutting off the feed to the second pile and feeding to the warehouse further quantities of KCl from a feed point positioned substantially at the central portion of the roof of the warehouse, said feed point being no greater than 50 feet above the portion of the inside surface of the second pile, onto which the KCl is fed, and continuing the feed to provide a conical pile of KCl in contact with the inside of said second conical ring and having an apex positioned within 30 feet of the roof.

11. The method of claim 10 wherein the first continuous ring of KCl is adjacent the inside wall of the warehouse.

12. A method of storing KCl particles of a size range of 6 to 28 mesh in a plurality of circular rings of diminishing diameter in a warehouse, comprising establishing a first circular conical pile of KCl adjacent the inside wall of the warehouse by continuously introducing KCl into the warehouse from a feed point not more than 40 feet above the floor of the warehouse until a conical pile of KCl of fixed vertical height is formed, extending the apex of the conical pile thus formed by moving the feed point circumferentially around the warehouse and thereby establishing a first continuous conical pile of KCl of said fixed vertical height around the warehouse, shutting off the feed of KCl to said first pile, continuously feeding KCl onto the inside surface of the first conical pile from a feed point not more than 50 feet above the portion of the inside surface of the first pile onto which the KCl is fed until a conical pile of a given vertical height that is higher than the vertical height of the first pile is formed, extending the apex of the conical pile thus formed by moving the feed point circumferentially around the warehouse and thereby establishing a second continuous conical pile of KCl of said given vertical height inside the confines of the first pile, shutting off the feed of KCl to the second pile, and feeding further KCl onto the inside surface of the second pile from a feed point substantially at the center of the warehouse and not more than 50 feet above the portion of the inside surface of the second pile onto which the KCl is fed until a conical pile of KCl having an apex within 30 feet of the warehouse roof is formed.

* * * * *